United States Patent [19]

Kuhls et al.

[11] 4,368,296

[45] Jan. 11, 1983

[54] FREE-FLOWING SINTERING POWDERS WHICH HAVE IMPROVED PROPERTIES AND ARE BASED ON TETRAFLUOROETHYLENE POLYMERS, AND A PROCESS FOR THEIR MANUFACTURE

[75] Inventors: Jürgen Kuhls; Robert Hartwimmer, both of Burghausen/Salzach, Fed. Rep. of Germany

[73] Assignee: Hoechst Aktiengesellschaft, Frankfurt, Fed. Rep. of Germany

[21] Appl. No.: 214,465

[22] Filed: Dec. 8, 1980

[30] Foreign Application Priority Data

Dec. 12, 1979 [DE] Fed. Rep. of Germany ....... 2949908

[51] Int. Cl.$^3$ ...................... C08J 3/12; C08F 214/26; C08F 114/26
[52] U.S. Cl. .................................. 525/276; 525/266; 526/250; 526/247; 524/544; 524/546
[58] Field of Search ...................... 525/276; 260/42.49; 526/250, 247

[56] References Cited

U.S. PATENT DOCUMENTS 3,142,665  7/1964  Cardinal et al. .................. 260/92.1
3,819,594  6/1974  Holmes et al. ................. 260/87 SA
3,980,612  9/1976  Gangal ............................. 260/42.22
4,036,802  7/1977  Poirier ......................... 260/29.6 PB

FOREIGN PATENT DOCUMENTS 917223  1/1963  United Kingdom .

Primary Examiner—Carman J. Seccuro
Attorney, Agent, or Firm—Connolly and Hutz

[57] ABSTRACT

Free-flowing sintering powders based on polymers containing at least 98.5% by weight of tetrafluoroethylene units can be prepared from colloidal polymer dispersions obtained in a customary manner by emulsion polymerization, stirring being carried out initially, optionally with the addition of an inorganic salt, until thickening, indicated by optical inhomogeneities, is achieved, an organic liquid which wets the polymer particles and is soluble in water to the extent of not more than 15% by weight then being added and stirring then being continued until granules are produced. The polymers preferably contain up to 1.5% by weight of polymerized units of at least one modifying, perfluorinated monomer. The free-flowing sintering powders have a high bulk density, an excellent flow time and further advantageous properties. They can be provided with customary fillers and are suitable for ram extrusion and for press-sintering processing to give sintered blocks and subsequently veneer-cut films.

7 Claims, No Drawings

FREE-FLOWING SINTERING POWDERS WHICH HAVE IMPROVED PROPERTIES AND ARE BASED ON TETRAFLUOROETHYLENE POLYMERS, AND A PROCESS FOR THEIR MANUFACTURE

The invention relates to free-flowing sintering powders based on polymers containing at least 98.5% by weight of polymerized tetrafluoroethylene units and to a process for their manufacture wherein a colloidal dispersion of polymer which has been prepared in an aqueous medium in the presence of a surface-active compound is stirred, if appropriate with the addition of an inorganic compound which dissociates and is readily soluble in water, until an adequate degree of thickening is obtained, as indicated by the appearance of clearly visible optical inhomogeneities, an organic liquid which readily wets the polymer particles present in the dispersion is then added and, after some time, the resulting polymer granules are washed, separated from the aqueous medium and dried.

A process for the manufacture of free-flowing, granulated tetrafluoroethylene polymers is known from U.S. Pat. No. 2,593,583, in which process a colloidal dispersion of polymer which has been prepared in an aqueous medium with the addition of emulsifiers is stirred, until the process is complete, at 0° to 85° C. using an energy of approx. 4 to 200 $Js^{-1}l^{-1}$ without the addition of any auxiliaries. The addition of electrolytes or organic precipitants, for example acetone or methanol, is described as disadvantageous.

Canadian Patent Specification No. 566,352 describes a molding powder containing a mixture of 80 to 98% by weight (relative to the mixture) of iron carbonyl particles and 20 to 2% by weight of tetrafluoroethylene polymer particles having an average particle size of 0.25 to 0.5 $\mu$m. The iron particles are substantially uniformly coated with the polymer and can be extruded under pressure to give self-supporting articles. The molding powders are manufactured by adding the iron particles and water to the dispersion, while stirring, until the desired high content of iron particles has been reached and a syrupy liquid has been obtained, which is then stirred vigorously or ground in a ball mill until a doughy composition is formed. Nothing else is added.

A process for the continuous coagulation of aqueous, colloidal dispersions of tetrafluoroethylene polymers containing a small proportion of dispersing agents is also known from U.S. Pat. No. 3,046,263, in which process, once again without anything further being added, the dispersion is thoroughly mixed for a short time, for example in a centrifugal pump at an energy of approx. 200 to 20,000 $J.s^{-1}l^{-1}$ with the exclusion of air, is then passed through a capillary tube which causes a pressure drop of 3.4 to 138 kPa, and is then stirred in the presence of air at an energy of 49 to 9,850 $J.s^{-1}l^{-1}$ and is separated off and dried.

A process for the manufacture of a moldable material for bearings is known from British Patent Specification No. 917,223 wherein one or more fillers in a finely divided form are intimately mixed with the dispersion containing polytetrafluoroethylene, the dispersion is coagulated and the coagulation product is dried, densified under pressure to form a self-supporting, solid composition and then ground. For the coagulation it is preferable to add aluminum nitrate or another coagulating agent to the mixture consisting of the filler and the polytetrafluoroethylene dispersion. No further additives are used.

German Auslegeschrift No. 1,520,544 describes polytetrafluoroethylene molding powders which have a total surface of at least 3 but less than 9 $m^2/g$, a moldability index of less than 50 and a bulk density (apparent density) of 420 to 685 g/l and which preferably have a specific gravity of less than 2.2. The molding powders are prepared by a specific polymerization process in which initially tetrafluoroethylene is polymerized in an aqueous medium at a temperature of 60° to 130° C. and a pressure of 10 to 50 atmospheres gauge, the aqueous medium being stirred at a power input within the range from 4 to 20 $J.s^{-1}l^{-1}$ at a ratio of power to flow coefficients of at least 1.4 and at least $5 \times 10^{10}$ nuclei having a total surface area of more than 9 $m^2/g$ per ml being formed, after which the polymerization is carried out with enlargement of the particles until the particles have a total surface area of less than 9 to 3 $m^2/g$. The solids are filtered off from the suspension thus formed and are dispersed in water, cut for a short time with a high-speed blade stirrer and then stirred for a longer time at a rate just sufficient for the particles which are not moist with water to remain submerged, after which the solids are filtered off and dried. Organic liquids which wet the particles are not added.

A process is known from German Auslegeschrift No. 1,745,907 in which a dry powder, containing mainly polytetrafluoroethylene, is granulated by stirring at temperatures of 0° to 100° C. in an aqueous emulsion containing 5 to 50% by weight of organic liquids such as benzine, benzene, amyl acetate, n-butanol, diisopropyl ether, chloroform or chlorobenzene, so that press-sinter powders having a high bulk density of up to, and exceeding, 600 g/l are formed. For example, using a starting material having a particle size of 0.05 $\mu$m, a treated material having a bulk density of 660 g/l is obtained.

U.S. Pat. No. 3,980,612 describes a similar process in which a powder mixture consisting of a tetrafluoroethylene polymer having a particle size of 5 to 200 $\mu$m and containing 5 to 40% by volume of a metal-containing filler, is granulated by stirring in a two-phase liquid containing water and an organic liquid by adding an aqueous dispersion of a tetrafluoroethylene polymer which has been prepared by polymerization in the presence of an emulsifier. The dry tetrafluoroethylene polymer powder is prepared by suspension polymerization and subsequent grinding. According to the examples, the granulation mixture contains a quantity of dry polymer which is about 5 to 50 times the quantity of the polymer added as the aqueous dispersion.

Furthermore, a polymerization process is known from German Auslegeschrift No. 2,523,570 in which, by means of a specific initiator system, inter alia also in the presence of an emulsifier, polymers are obtained which can be processed by the press-sinter technique without exhibiting the undesirable formation of cracks in the sinter blocks which is otherwise observed in the case of emulsion polymers. In accordance with Examples 13 to 20, the dispersion obtained as a result of emulsion polymerization is diluted to a solids content of 10% by weight, relative to the liquor, by adding water and is stirred to complete the reaction at 22° to 25° C. with a stirrer in which 4 four-bladed stirring elements are arranged, distributed in a staggered manner over the shaft, and is washed twice and dried. Nothing is stated concerning the use of any additives in stirring the aqueous dispersion to complete the reaction.

The known processes and the polymers or molding powders prepared by them possess at least one or more of the following disadvantages: relatively low bulk density, relatively poor flow, relatively unfavorable particle stability, relatively low specific surface area, relatively high specific gravity, relatively unfavorable moldability index, considerably higher deformation under load or relatively low ball indentation hardness.

Only dried polymer powders which have been very finely ground can be employed. In spite of very fine grinding, the granules produced result in shaped articles having mechanical and/or electrical values which leave something to be desired. The polymer containing tetrafluoroethylene and the filler added display a tendency to separate into component parts. A special pretreatment of the filler is necessary. The product formed is not very suitable for processing by the press-sinter process owing to insufficient heat stability and formation of cracks in the sintered moldings produced therefrom. A relatively expensive apparatus is required for production; the process is susceptible to trouble as a result of pieces of equipment becoming blocked. Production of the molding powders occasionally requires drying and also in certain cases densification under pressure with subsequent grinding.

Sinterable polymer powders and a process for their manufacture have now been found which do not possess the disadvantages of the known powders and the processes for their manufacture. The invention relates to a sinterable polymer powder, comprising 98.5 to 100% by weight of polymerized tetrafluoroethylene units and 1.5 to 0% by weight of polymerized units of at least one modifying, perfluorinated monomer in which one fluorine atom can be replaced by chlorine and which is copolymerizable with tetrafluoroethylene, which polymer powder combines the following properties: specific surface area of 5 to 11 m$^2$/g; standardized specific gravity of less than 2.2; flow time of less than 3.1 seconds/25 g; bulk density of 700 to 860 g/l; particle stability of 2.7 to 5 seconds/50 g; moldability index of less than 11 and deformation under load of less than 14%.

The invention also relates to a sinterable polymer powder containing filler and comprising 95 to 60% by volume of a polymer which contains 98.5 to 100% by weight of polymerized tetrafluoroethylene units and 1.5 to 0% by weight of polymerized units of at least one monomer in which one fluorine atom can be replaced by chlorine and which is copolymerizable with tetrafluoroethylene, also comprising 5 to 40% by volume of a filler consisting of at least one metal, metal oxide, metal sulfide, metal silicate or metal sulfate or of carbon having a particle size which is at most 90% of the particle size of the sinterable polymer powder and a melting point of at least 380° C., all the % by volume figures relating to the polymer powder which contains filler and all the % by weight figures relating to the polymer powder without filler, which polymer powder combines the following properties: specific surface area of 1.5 to 8 m$^2$/g; flow time of <3.5 seconds/25 g; bulk density of 550 to 1,400 g/l; particle stability of 1 to 3.5 seconds/50 g; deformation under load of less than 8% and a ball indentation hardness of >30 N/mm$^2$.

Within the scope of the present invention "sinterable polymer powders" are to be understood as polymer powders which have a melt viscosity (shear viscosity) at 350° C. of ≧0.1 GPa s, frequently ≧0.1 GPa s up to about 900 GPa s. Such polymer powders cannot be processed from the melt by conventional processing method for thermoplastics. The melt viscosity (shear viscosity) is determined by the method (creep test) of Ajroldi et al., described in J. appl. Polym. Sci., 14, 1970, page 79 et seq. The method is described in greater detail in U.S. Pat. No. 4,036,802, column 9, line 46 to column 10, line 41. For the determinations within this application it was modified as follows: measurement of elongation at 350° C.; test piece with a width of 0.25 cm, a thickness of 0.65 cm and a measured length of 3.5 cm in the elongation test.

The sinterable polymer powder contains primary particles of an average particle size of 0.05 to 0.8 μm, preferably 0.2 to 0.5 μm, which have been agglomerated to form granules having an average individual diameter of 150 μm to 850 μm, preferably 180 to 650 μm. The sinterable polymer powder which contains filler also contains of primary particles of the above-mentioned average particle size which have been agglomerated to form grains having an average diameter which is 500 to 700 μm and is at least 35% larger than the average diameter of the filler particles.

The polymer is prepared by polymerization to give colloidal dispersions by the process of emulsion polymerization with or without the use of a seed polymer and it can, from its preparation, still contain residual constituents of polymerization auxiliaries, particularly a fluorinated dispersing agent which is inactive as a telogen. It can be composed exclusively of polymerized tetrafluoroethylene units or can have a uniform modification such as can be obtained, for example, in accordance with U.S. Pat. No. 3,142,665 or U.S. Pat. No. 3,819,594. The polymer can, however, also possess a core/shell structure built up in various ways depending on the quantity and nature of the modifying agent, or a multi-shell structure such as can be produced by the processes in German Patent Specification No. 1,795,078, U.S. Pat. No. 4,036,802, German Offenlegungsschrift No. 2,620,284 or German Offenlegungsschrift No. 2,521,738 or is described in German Patent Application No. P 2,949,907.8.

The sinterable polymer powder, or the polymer component of the sinterable polymer powder which contains filler, is preferably composed of primary particles which have been prepared using the seed technique by polymerization to give colloidal dispersions in an aqueous medium in the presence of 0.01 to 0.5% by weight, relative to the aqueous medium, of at least one fluorinated dispersing agent which is inactive as a telogen, employing 5 to 10% by weight, relative to the final polymer obtained therefrom, of a seed polymer which contains 94 to 99.9% by weight of polymerized tetrafluoroethylene units and 6 to 0.01% by weight of polymerized units of a perfluorinated monomer in which one fluorine atom can be replaced by chlorine, the last two % by weight figures relating to the seed polymer.

Examples of suitable perfluorinated monomers are perfluoroalkenes of the formula:

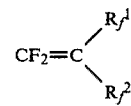

wherein $R_f^1$ denotes fluorine or a perfluorinated alkyl radical which has 1 to 4, preferably 1 to 2, C atoms and which has a straight chain and $R_f^2$ denotes a perfluorinated alkyl radical which has 1 to 4, preferably 1 to 2, C atoms and has a straight chain. Perfluoro-(alkyl-vinyl) ethers of the formula $CF_2=CF-OR_f^3$ wherein $R_f^3$ denotes a perfluorinated alkyl radical which has 1 to 5, preferably 1 to 3, C atoms and has a straight chain, are also suitable. Perfluorinated dioxanyl vinyl ethers such as are described in German Offenlegungsschrift No. 2,544,040 or perfluoropropoxyvinyl ethers or perfluoro(2-methylene-4-methyl)-1,3-dioxolane are also suitable.

In the perfluorinated alkenes mentioned above one fluorine atom can be replaced by a chlorine atom; this chlorine atom is preferably linked to a carbon atom carrying the double bond. For example, in the formula indicated above $R_f^1$ can also be chlorine or, if $R_f^1$ is fluorine, $R_f^2$ can be chlorine.

Perfluorinated monomers which are particularly preferred are perfluoropropyl vinyl ethers or perfluoropropylene.

One or more of the abovementioned monomers can be present during both the seed polymerization and the main polymerization which is carried out in the presence of the seed. Chlorine-containing monomers are appropriately only employed in the seed polymerization. If the polymerization is carried out in different stages, the nature and quantity of the monomers employed can vary from stage to stage. The proportion of perfluorinated monomers which is present during the emulsion polymerization is 0.0005 to 3% by weight, preferably 0.01 to 1.0% by weight, relative to the tetrafluoroethylene employed, without taking account of a possible initial quantity of seed, irrespective of whether the emulsion polymerization is carried out with or without the initial introduction of a colloidal seed dispersion. The perfluorinated monomers are preferably metered into the reaction vessel in one total quantity before the start of the polymerization. They can, however, also be added subsequently, through a lock, to the polymerization reaction in progress, specifically at any point in time before a conversion of 99.5%, preferably 75%, has been achieved. In particular, the main polymerization which is carried out in the presence of the initial quantity of seed can be started initially exclusively with tetrafluoroethylene. The perfluorinated monomers are then added through a lock at a tetrafluoroethylene conversion of 25 to 99.5%, preferably 75 to 99.5%. It is also possible initially to introduce a fraction of the required quantity of perfluorinated monomers and to add a further fraction subsequently, through a lock, during the polymerization reaction. If appropriate, the addition of the perfluorinated monomers can be effected continuously or in portions from the start of the polymerization in progress up to or from the point at which the particular degree of conversion desired is achieved.

What is preferred is a sinterable polymer powder, optionally containing filler, the polymer component of which is prepared in accordance with the seed technique by polymerization in an aqueous medium in the presence of 0.01 to 0.5% by weight, relative to the aqueous medium, of at least one fluorinated dispersing agent which is inactive as a telogen, employing 4 to 12% by weight, relative to the final polymer obtained therefrom, of a seed polymer which contains 94 to 99.99% by weight of polymerized tetrafluoroethylene units and 6 to 0.01% by weight of polymerized units of a perfluorinated monomer in which one fluorine atom can be replaced by chlorine, the last two % by weight figures relating to the seed polymer.

A sinterable polymer powder, optionally containing filler, the polymer component of which contains 98.5 to 99.99% by weight of polymerized tetrafluoroethylene units and 1.5 to 0.01% by weight of polymerized units of at least one open-chain, perfluorinated monomer containing a $CF_2=C>$ group, 3 to 6 carbon atoms and 0 to 2 oxygen atoms is particularly preferred; particularly good results are obtained in this respect if the perfluorinated monomer is perfluoropropylene or is a straight-chain perfluoroalkyl vinyl ether, preferably perfluoropropyl vinyl ether.

The sinterable polymer powder containing filler comprises 95 to 60% by volume, preferably 85 to 70% by volume, of a polymer containing mainly tetrafluoroethylene units and 5 to 40% by volume, preferably 15 to 30% by volume, of a filler, the % by volume figures relating to the polymer powder which contains filler. The filler should have a melting point of at least 300° C., preferably at least 450° C., and should not react with the polymer under the processing conditions, that is to say 400° to 450° C., if appropriate under an atmosphere of an inert gas, for example nitrogen. The particle size of the filler should be at most 90% of the particle size of the sinterable polymer powder containing filler. The minimum value of the particle size of the filler is limited to an average particle size of 0.1 μm as a result of the possibility of preparing the filler, its tearability and its ease of handling. It is preferable to employ fillers having an average particle size of 2 to about 100 μm and particularly a particle size of 5 to 60 μm. If fibrous products are concerned, the particle size figures relate to the diameter of the fibers.

Suitable fillers are metals and metal alloys, for example iron, copper, silver, bronze or chrome-nickel steel, and also metal oxides, for example aluminum oxide, titanium oxide, chromium oxide, manganese dioxide or silicon dioxide, or metal sulfides, for example molybdenum disulfide, and also metal sulfates, for example barium sulfate, or metal silicates, for example glass powder or fibers, asbestos, mica, fireclay, ceramics and also carbon, such as graphite, coal or coke.

Within the scope of the above percent by volume figures, one or more fillers can be employed.

The nature, quantity added and particle shape of the filler or fillers used affect the density, specific surface area, flow, bulk density and also the particle stability of the sinterable polymer powder containing filler, in some cases considerably, so that it is only possible to make an exact comparison, in order to establish the advantages of the polymer powder containing filler produced by the process according to the invention compared with polymer powders according to the state of the art, if the same filler, or the same mixture of fillers, is employed in the same quantity in each case.

The sinterable polymer powder containing filler according to the present invention has a specific surface area of 1.5 to 8, preferably 2 to 7, m²/g; a flow time of less than 3.1, preferably less than 2.9, seconds/25 g; a bulk density of 550 to 1,400, preferably 600 to 1,400, g/l; a particle stability of 1 to 3.5, preferably 1 to 3.0, seconds/50 g; a deformation underload of less than 8%, preferably less than 6%, and a ball indentation hardness greater than 30 N/mm², preferably greater than 35 N/mm², to about 45 N/mm². These properties are determined by methods which are indicated later in the text.

The sinterable polymer powders according to the present invention which do not contain filler possess a specific surface area of 5 to 11, preferably 7 to 9, m²/g; a standardized specific gravity of less than 2.2, preferably less than 2.17; a flow time of less than 3.1, preferably 2.6, seconds/25 g; a bulk density of 700 to 860, preferably 750 to 800, g/l; a particle stability of 2.5 to 7, preferably 3 to 4, seconds/50 g and a moldability index of less than 11, preferably less than 8.

The invention further relates to a process for the manufacture of a sinterable polymer powder which optionally contains filler and is based on a polymer which has been obtained by polymerization in an aqueous medium in the presence of 0.01 to 0.5% by weight, relative to the aqueous medium, of at least one fluorinated dispersing agent which is inactive as a telogen, with the formation of a colloidal dispersion having an average polymer particle size of 0.05 to 0.8 μm and a total solids content of 10 to 50% by weight, relative to the dispersion, and which contains 98.5 to 100% by weight of polymerized tetrafluoroethylene units and 1.5 to 0% by weight of polymerized units of at least one perfluorinated monomer in which one fluorine atom can be replaced by chlorine and which is copolymerizable with tetrafluoroethylene, the polymer dispersion being adjusted to a solids content of about 5 to 15% by weight and being stirred at 10° to 85° C. at an energy of 4 to about 200 $J.s^{-1} l^{-1}$ and an organic liquid being added, after which, if appropriate, the filler is added and, after the formation of granules, the product is washed and is then finally separated from the liquid phase and dried, wherein, before the addition of the organic liquid, the dispersion is stirred until an adequate degree of thickening of the dispersion is obtained, indicated by clearly visible optical inhomogeneities, while adding 0 to 2% by weight, relative to the dispersion, of at least one water-soluble, dissociating, inorganic salt which contains an ammonium cation or a metal cation, and/or a water-soluble acid by means of which the pH of the dispersion is adjusted to 0 to 6, and 0 to 10 minutes later, without intermediately separating, drying and grinding the polymer, 1 to 5% by weight, relative to the dispersion, of an organic liquid which readily wets the polymer particles present in the dispersion and which is soluble to the extent of less than 15% by weight in water at 20° C., is added to the dispersion.

Polymer dispersions which are suitable for the process can be prepared by known processes, such as are described, for example, in U.S. Pat. Nos. 2,559,752; 3,088,941; 3,142,665; 3,819,594; and 4,036,802 and German Offenlegungsschriften Nos. 1,795,078; 2,521,738 and 2,620,284. The process can be carried out using the polymerization technique already described, without or with an initial quantity of a seed polymer and in the absence or presence of the perfluorinated monomers which have also been described in greater detail earlier in the text. The temperature during the polymerization is generally 10° to 80° C. and the pressure is 0.2 to 3.5 MPa.

It is preferable to employ dispersions which have an average polymer particle size of 0.01 to 0.8 μm; preferred dispersions are, furthermore, those which have been prepared in the presence of perfluorinated monomers and which have polymer particles containing 98.5 to 99.99% by weight of polymerized tetrafluoroethylene units and 1.5 to 0.01% by weight of polymerized units of these perfluorinated monomers. Perfluorinated monomers which are particularly preferred in this connection are those containing a $CF_2\!=\!C\!<$ group, 3 to 6 carbon atoms and 0 to 2 oxygen atoms. Perfluoropropylene or straight-chain perfluoroalkyl vinyl ethers, preferably perfluoropropyl vinyl ether, are particularly preferentially employed as the perfluorinated monomers. After the completion of the polymerization and removal of unreacted monomers, the dispersion is optionally adjusted, by means of water, to a total solids content of about 5 to 15, preferably 9 to 11, % by weight, insofar as it does not already emerge from the polymerization with this solids content, and, if necessary, is brought to a temperature of 10° to about 85° C. It is preferable to carry out further processing at a temperature of 15° to 60° C.

The dispersion is now stirred at an energy of 4 to 200 $J.s^{-1} l^{-1}$, preferably at 15 to 70 $J.s^{-1} l^{-1}$, until an adequate degree of thickening of the dispersion is obtained, indicated by the appearance of clearly visible optical inhomogeneities (so-called "streaks"); stirring elements of a very wide variety of designs can be used for stirring, for example flat blade stirrers, paddle stirrers, propeller stirrers, impeller stirrers or anchor stirrers or high-speed stirrers, for example the "Ultra Turrax" ® Type 4/22-640 made by Lutz. The last-mentioned stirrers are, however, preferably not switched on until, or after, the organic liquids described in greater detail later in the text are added. Baffles can be fitted in the stirred vessel in order to increase the intensity of stirring.

In general it is sufficient to determine visually whether the dispersion has been adequately thickened, by means of the optical inhomogeneities (streaks). However, it is also possible to use other criteria for this purpose, for example a sudden increase in the power required by the stirrer or in the viscosity, measured in a flow viscometer.

Before stirring is begun, it is possible to add to the dispersion up to 2% by weight, preferably 0.01 to 1% by weight, relative to the dispersion, of at least one water-soluble, dissociating, inorganic salt containing an ammonium cation or a metal cation, and/or a water-soluble acid by means of which the pH of the dispersion is adjusted to 0 to 6. Examples of suitable salts are neutral or acid salts of sodium, potassium, calcium, magnesium or aluminum with mineral acids, for example hydrochloric acid, sulfuric acid, nitric acid or phosphoric acid. It is preferable to employ ammonium salts which are volatile below 300° C., for example ammonium chloride or ammonium nitrate. It is also possible to use mixtures of different salts. Instead of the salts described earlier in the text, or together with them, one or more water-soluble acids can be employed by means of which the pH of the dispersion is adjusted to 0 to 6, preferably to 1 to 4. Acids which are preferred for this purpose are strong mineral acids, a 1-normal aqueous solution of which has a pH of less than 1 at 20° C. and which are relatively readily volatile, that is to say which boil below 240° C. at 0.1 MPa, if appropriate as an azeotrope with water, or which decompose with the formation of volatile substances only. Examples of such acids are hydrochloric acid, nitric acid and sulfuric acid.

After the dispersion has been adequately thickened as described above, 1 to 5% by weight, preferably 2 to 4% by weight, relative to the dispersion, of at least one organic liquid which readily wets the polymer particles present in the dispersion and which is soluble to the extent of less than 15% by weight in water at 20° C., is added. Stirring is continued meanwhile; it is advantageous to continue processing for 1 to 6 minutes, particularly for 2 to 4 minutes, at an increased stirring energy, for example by switching on a high-speed stirrer, as described above. It is also possible to switch off the previous stirrer and to switch on the high-speed stirrer alone. The increased stirring energy should operate sufficiently long for rapid and complete granulation of the polymer to be achieved. If the vigorous stirring is continued for too long a period, the granules formed are comminuted to an increasing extent, so that the particle size of the granules can be adjusted by varying the period during which the vigorous stirring operates.

After vigorous stirring has been stopped, stirring is continued, as described earlier in the text, for about a further 10 to 100 minutes, preferably 20 to 80 minutes. During this stirring period or subsequently, the solid is separated from the liquid phase by filtering or screening twice to about 7 times, and is stirred up with water again in order to wash it. The solid is then finally separated from the liquid phase and dried at temperatures of 100° to 290° C., preferably 200° to 280° C. A belt-type dryer or a drying cabinet, for example, can be used for this purpose, the drying gas, as a rule air, being propelled, for example, by circulatory pumping, ventilation or extraction by suction. As a rule drying is carried out under normal atmospheric pressure. However, it is also possible to use a reduced pressure.

The organic liquid can be added to the dispersion immediately after, or up to 10 minutes after, ascertaining that an adequate degree of thickening has been achieved. It is preferable to add the organic liquid to the dispersion 0 to 3 minutes, particularly 0 to 1 minute, after the appearance of optical inhomogeneities.

The following are examples of suitable organic liquids: benzine, n-hexane, n-octane, cyclohexane, benzene, toluene, butyl acetate, amyl acetate, n-butanol, n-hexanol, diethyl ether, diisopropyl ether, chloroform and methylene chloride. It is also possible to add mixtures of several organic liquids. It is advantageous to employ organic liquids which are soluble to the extent of less than 3% by weight in water at 20° C., especially a hydrocarbon or a mixture of hydrocarbons having a boiling point of 60° to 180° C., preferably 80° to 150° C., under a pressure of 0.1 MPa.

Sinterable polymer powders containing filler are prepared by employing the fillers described earlier in the text in the quantities indicated in the text. The filler or fillers are preferably added together with the organic liquid or immediately after the addition of the latter. The process according to the invention makes it possible to process, in a single operation, without intermediate drying and comminution of the polymer with the formation of granules, an aqueous, colloidal dispersion of a polymer which contains mainly tetrafluoroethylene units and which has been prepared by the emulsion technique in the presence of a dispersing agent and which is suitable for further processing by the press-sinter process or the ram extrusion process. Shaped articles which have very good mechanical values, such as tensile strength and elongation at break, and electrical values, such as breakdown strength, are obtained by this process. Sheets sliced from sintered blocks are virtually crack-free, whereas from emulsion polymers which have been produced in accordance with the state of the art, it is only possible to obtain sintered blocks which exhibit a considerable tendency to form cracks. The process according to the invention makes it possible to produce sinterable polymer powders, optionally containing filler, which have a particularly good combination of properties in respect of bulk density, flow, particle stability, specific surface area and deformability index, while having good heat stability.

The new process has a low susceptibility to trouble and can be carried out without a major outlay of expenditure on equipment and energy.

The parameters indicated in the preceding description and in the examples which follow are determined by the following methods:

1. Specific surface area

This is determined by means of the Areatron (manufactured by Leybold, Cologne) using the method of S. Brunauer, P. Emmet and E. Teller; J. Amer. Chem. Soc., 60,1938, page 309 et seq.

2. Bulk density

Determined as specified in DIN 53,468.

3. Flow time

A polyethylene funnel having the following dimensions: upper internal diameter: 100 mm; lower internal diameter: 12 mm; height of cone: 75 mm; is attached to a vibrator (E 1 Vibro-Mixer, AG für Chemie-Apparatebau Zürich) in such a way that the distance from the motor casing of the vibrator to the center of the funnel is 125 mm. 25 g of product are filled into the funnel and the vibrator is switched on at an amplitude of vibration of 2 mm. The time (in seconds) from switching on the vibrator until the funnel is completely empty is determined. It is quoted, in relation to the quantity which has flowed out, as a measure of the flow.

4. Particle stability

An aluminum beaker (height 150 mm; internal diameter: 100 mm) with a flat bottom manufactured from polytetrafluoroethylene is equipped with a three-bladed propeller stirrer (diameter of stirring element: 96 mm) driven by a stirring motor with an infinitely variable control. The stirrer shaft is carried on a bearing in the bottom of the beaker.

50 g of polymer powder, the flow time of which has been determined previously, are filled into this cylindrical beaker and are stirred for 5 minutes, the speed of stirring depending on the average individual diameter of the powder to be tested. At average individual diameters up to 500 $\mu$m the stirrer speed is 400 rpm, while above 500 $\mu$m it is 800 rpm. In the case of powders containing filler, a stirrer speed of 600 rpm and a stirring time of 2 minutes are used, irrespective of the average individual diameter.

After the stirring has been completed, the flow time of the polymer powder is determined again. All the determinations of flow time are carried out with 50 g of powder. The difference in flow times before and after stirring the powder (in seconds/50 g) is quoted as a measure of the particle stability. The smaller this value is, the higher is the particle stability.

5. Standardized specific gravity (SSG)

The determination is carried out as specified in ASTM 1457-56 T. In the case of polymer powders not containing filler, circular sintered plates which have a diameter of 25 mm and a thickness of 3.5 mm and have been manufactured at a molding pressure of 34.5 MPa are used in accordance with the abovementioned specification.

In the case of polymer powders which are filled with glass, circular sintered plates having a diameter of 80 mm and a thickness of 2 mm are used for the determination by the ASTM method. For the determination in the case of polymer powders which are filled with coal, graphite or bronze, circular plates having a diameter of 45 mm and a thickness of 4 mm are employed.

6. Moldability index

Two determinations of the standardized specific gravity (SSG) as specified in ASTM 1457-56 T are carried out as described above, using circular sintered plates. A sintered plate which has been molded at a pressure of 34.5 MPa is used for the first determination, while a sintered plate which has been molded at a pressure of 13.8 MPa is used for the second determination. The result of the second determination is subtracted from that of the first determination and the figure obtained is multiplied by 1000.

7. Average particle size ($d50$)

The determination is carried out by sieve analysis as specified in DIN 53,477.

8. Tests on 1 kg sintered blocks 1 kg of the polymer powder is compressed to form a cylindrical block under a pressure of 25.0 MPa and the block is then sintered for 4 hours at 375° C. and is subsequently cooled at a rate of 45° C./hour. The blocks have a diameter of 95 mm.

9. Formation of cracks

The sintered 1 kg blocks are sliced to give a film 200 $\mu$m thick until an inner core having a diameter of 49 mm is reached and the diameter of the uncut residual block when cracks first appear is taken as a basis for the extent of formation of cracks. The tensile strength and the elongation at break and also the electrical breakdown strength of the sliced films obtained are determined as described later in the text.

10. Tensile strength and elongation at break

The determination is carried out as specified in ASTM 1457-62 T.

11. Electrical breakdown strength

This is determined as specified in VDE (Association of German Electrical Engineers) 0303/T 2. The tester used is an insulation tester made by Messwandler Bau GmbH, Bamberg; Form IPG 30/05; electrodes at top, ball 20 mm diameter, lower plate 50 mm diameter. The measuring instrument is converted so that a motor moves the film on 10 cm after each breakdown, after which a new determination is automatically started. The voltage required for breakdown is recorded as a peak by means of an attached recording instrument.

At least ten individual values are used to calculate an average value, and values which are below 75% of the second highest value are not used for the calculation. The number of individual values from which the average value is determined must, however, be at least 70% of the total number of individual values.

12. Tests on tubes and rods produced by ram extrusion

The polymer powder to be tested is either used as such or subjected to a heat treatment for 30 minutes at 340° C. The average particle size ($d50$), the bulk density and the flow time are determined after the heat treatment. These powders are extruded by means of a ram extruder which has a sinter zone length of 800 mm, the temperature being adjusted to 380°, 390° and 380° C. in the direction of extrusion, at an output of 3 m/hour to give tubes with an internal diameter of 32 mm and an external diameter of 39 mm, or at an output of 2 m/hour to give rods with a diameter of 22 mm.

The tubes are reduced to a wall thickness of 2 mm by turning and test pieces are punched out in the direction of extrusion and are used for determining the tensile strength and elongation at break as specified in ASTM 1708.

Small sheets 2 mm thick are cut by milling from the rods in the direction of extrusion, test pieces are punched out in turn from these small sheets and the tensile strength and elongation at break are determined as specified in ASTM 1708.

13. Tests on polymer powders containing filler

The tensile strength and elongation at break are determined as specified in ASTM-D 1708-66. In the case of polymer powders filled with glass fibers, the test pieces are punched out of molded sheets, produced as indicated earlier in the text in the determination of the standardized specific gravity (SSG), but the sheets have a thickness of 1.6 mm. In the case of polymer powders which are filled with coal, graphite or bronze, cylindrical press-sinter articles with a diameter of 45 mm and a height of 75 mm are produced by compression at the pressures of 35 to 70 MPa which are specific for the filler content of the polymer powders and by sintering at 380° C. for 4 hours with a heating and cooling time of 8 hours in each case. For the determination of tensile strength and elongation at break, a disk 2 mm thick is removed in the direction of action of the press and the test pieces are punched out of this disk.

The determination of ball indentation hardness is carried out as specified in DIN 53,456 on compressed disks 4 mm thick, produced as described in the determination of the standardized specific gravity (SSG).

14. Deformation under load

The determination is carried out as specified in ASTM-D 621 at 20° C. on circular test pieces with a diameter of 10 mm and a thickness of 10 mm.

The following examples are intended to illustrate the invention in greater detail:

The polymer dispersions employed are prepared by the seed technique in accordance with the following process: 31 l of deionized water, 0.75 cm$^3$ of a 2% strength by weight solution of copper-II sulfate, 27.5 g of perfluorooctanoic acid and 37.5 cm$^3$ of an 18% strength by weight solution of ammonia in water are put into an enameled polymerization autoclave which has a capacity of 47 l and is equipped with an impeller stirrer. After the autoclave has been flushed several times with nitrogen, the quantity of perfluorinated monomer indicated in Table I below is metered in, as a liquid or gas, against a gentle stream of tetrafluoroethylene. The pressure is then increased to 1.4 MPa by admitting tetrafluoroethylene and the polymerization is started by subsequently metering in 1.2 g of sodium bisulfite and 1.15 g of ammonium persulfate as aqueous solutions, while stirring. Polymerization is carried out at a temperature of 35° C. When the dispersion has reached a solids content of 10% by weight, polymerization is discontinued.

The quantities of seed polymer indicated in Table I (% by weight, relative to final solids) are introduced into an enameled polymerization autoclave of capacity 47 l in the form of a 10% strength by weight seed dispersion, prepared as described above, together with the quantity of deionized water required to achieve a liquor of 31.2 l, 27.3 g of perfluorooctanoic acid, 37.5 cm$^3$ of ammonia (18% strength by weight solution in water) and 0.93 cm$^3$ of a 2% strength by weight solution of copper-II sulfate in water. After flushing several times with nitrogen, the pressure is increased to 1.4 MPa by admitting tetrafluoroethylene and the polymerization is started by subsequently metering in 1.37 g of sodium bisulfite and 2.18 g of ammonium persulfate, in each case as an aqueous solution, while stirring. Polymerization is carried out at a temperature of 28° C. After the conversion indicated in Table I below has been reached, the quantity of perfluorinated monomer indicated and at the same time, unless a note is made to the contrary, diethylene glycol as an aqueous solution are metered in. When the mixture being polymerized has reached a solids content of 20% by weight, the polymerization is brought to an end. The polymerization parameters are listed in Table I below. The individual vertical columns contain the following data:

column 1: letters characterizing the particular polymerization batch;

column 2: the nature of the perfluorinated monomer added, apart from tetrafluoroethylene, in the preparation of the seed dispersion;

column 3: the quantity of this perfluorinated monomer in % by weight, relative to the seed polymer formed;

column 4: the incorporation of this perfluorinated monomer into the polymer particles in % by weight, relative to the seed polymer formed;

column 5: the quantity of seed polymer used in % by weight, relative to the end polymer;

column 6: the perfluorinated monomer added in the second polymerization stage, apart from tetrafluoroethylene;

column 7: the quantity of this perfluorinated monomer in % by weight, relative to the end polymer;

column 8: the percentage conversion at which the perfluorinated monomer is added;

column 9: how much of the perfluorinated monomer is incorporated into the end polymer in the second stage, in % by weight relative to the final polymer;

column 10: the nature of the agent added, as an aqueous solution, in the second stage for stabilization;

column 11: the quantity of this agent in parts per million parts of the polymerization liquor, and column 12: the percentage conversion after which the stabilizing agent is added.

TABLE I

Preparation of the polytetrafluoroethylene dispersion polymers

| Polymerization batch | Seed modified with | Seed stage Modifying agent Initial quantity (% by weight) | Seed stage Modifying agent Incorporated (% by weight) | Seed polymer relative to final solids content % by weight | Shell modified with | Main polymerization Added through lock % by weight | Main polymerization Added through lock % conversion | Amount of shell % by weight | Stabilization Agent | Stabilization ppm | Stabilization % conversion |
|---|---|---|---|---|---|---|---|---|---|---|---|
| A | Seed consisting of 100% polytetrafluoroethylene | — | — | 5.7 | — | — | — | — | Dioxane | 20 | 0 (initially introduced) |
| B | CF$_3$CF=CF$_2$ | 2.2 | 1.0 | 6.0 | — | — | — | — | DEG$^{(1)}$ | 20 | 50 |
| C | CF$_3$CF=CF$_2$ | 2.2 | 1.0 | 8.4 | CF$_3$(CF$_2$)$_2$OCF=CF$_2$ | 0.6 | 0 (initially introduced) | 0.22 | | none | |
| D | CF$_3$CF=CF$_2$ | 2.2 | 1.0 | 8.4 | CF$_3$(CF$_2$)$_2$OCF=CF$_2$ | 0.5 | 33 | 0.16 | | none | |
| E | CF$_3$CF=CF$_2$ | 2.2 | 1.0 | 8.4 | CF$_3$(CF$_2$)$_2$OCF=CF$_2$ | 0.5 | 0 (initially introduced) | — | | none | |
| F | CF$_3$—(CF$_2$)$_2$OCF=CF$_2$ | 1.0 | 0.1 | 8.4 | CF$_3$CF=CF$_2$ | 0.5 | 75 | 0.15 | DEG | 20 | 0 (initially introduced) |
| G | CF$_3$—(CF$_2$)$_2$OCF=CF$_2$ | 1.0 | 0.1 | 8.4 | none | — | — | — | DEG | 20 | 0 (initially introduced) |
| H | CF$_3$CF=CF$_2$ | 2.2 | 1.0 | 8.4 | CF$_3$CF=CF$_2$ | 1.0 | 0 (initially introduced) | 0.3 | | none | |
| I | no initial quantity of seed | — | — | — | CF$_3$(CF$_2$)$_2$—O—CF=CF$_2$ | 0.5 | 0 (initially introduced) | 0.1 | | none | |
| J | CF$_3$CF=CF$_2$ | 2.2 | 0.6 | 7.2 | CF$_3$CF=CF$_2$ | 0.85 | 96 | 0.02 | Dioxane | 20 | 0 (initially |

TABLE I-continued

| | Preparation of the polytetrafluoroethylene dispersion polymers | | | | | | | | | |
|---|---|---|---|---|---|---|---|---|---|---|
| | Seed stage Modifying agent | | | | Main polymerization | | | | Stabilization | |
| Polymerization batch | Seed modified with | Initial quantity (% by weight) | Incorporated % by weight | Seed polymer relative to final solids content | Shell modified with | Added through lock % by weight | % conversion | Amount of shell % by weight | Agent ppm | % conversion introduced) |

(1)DEG = diethylene glycol

In batch A, apart from tetrafluoroethylene, no further perfluorinated monomer is added in the first stage of the polymerization (seed), but 30 parts of dioxane per million parts of liquor are used as chain stopper. Similarly, no further monomer, apart from tetrafluoroethylene, is added in the second stage (polymerization of the shell round the seed core). In batch I, the first stage of the polymerization is omitted and only the second stage of the polymerization is carried out, as described above, but without using a seed dispersion.

In batch B, only 95 mg of ammonium persulfate and 31 mg of azodicarboxamide are used instead of the polymerization starting system ammonium persulfate/sodium bisulfite. In batch J, 46 mg of azodicarboxamide and 96 mg of ammonium persulfate are used in the main polymerization.

The polymer dispersions which have been prepared as described are granulated in accordance with the invention as follows to give polymer powders which do not contain fillers: 12 kg of polymer dispersion having a solids content of 20% by weight are put into a 30 l glass vessel equipped with a stirrer made by Ekato (Type R 46-000; diameter of the stirring element=15 cm) and also a stirrer of the "Ultra-Turrax ®" brand (Type Lutz, 4/22-640; diameter of the stirring element=3.3 cm) and are diluted with water to a solids content of 10%. The Ekato stirrer is now switched on at a speed of 700 rpm and a stirring energy of 34 J.s$^{-1}$l$^{-1}$ and 30 cm$^3$ of concentrated hydrochloric acid are then added. After a short time distinct optical inhomogeneities (so-called streaks) are observed in the dispersion, indicating an adequate degree of thickening. The quantity of benzine having a boiling range of 80° to 110° C. indicated in % by weight, relative to polymer, in Table II below is now added and the Ultra-Turrax ® stirrer is switched on for 3 minutes at a speed of 1×10$^4$ rpm and a stirring energy of 25 J.s$^{-1}$l$^{-1}$. After the Ultra-Turrax ® stirrer has been switched off, stirring is continued for a further 10 minutes at a speed of 700 rpm by means of the Ekato stirrer, the granules formed are separated from the liquid phase by screening and are suspended in 20 l of deionized water, while stirring, and this washing procedure repeated five times. The last suspension is stirred for a further 30 minutes, as described above, and the granules and the water are then again separated by means of a sieve and the granules are dried in a circulating air drying cabinet for 6 hours at 280° C. to give a polymer powder. The values indicated in Table II below are determined on this polymer powder which has been obtained by granulation.

The first vertical column of the table indicates the serial number of the particular example; the second vertical column indicates the polymerization batch used for the preparation of the dispersion employed. The properties of the powders were determined by the methods described earlier in the text.

TABLE II

Granulation of the dispersion polymers listed in Table I

| Example No. | Polymerization batch | Benzine for granulation % by weight | SSG g/cm$^3$ | Particle size d 50 μ | Flow time seconds | Bulk density g/l | Particle stability seconds | Specific surface area m$^2$/g | Moldability index |
|---|---|---|---|---|---|---|---|---|---|
| 1 | A | 33 | 2.23 | 270 | 2.5* | 830 | 4.0 | 9.0 | 7 |
| 2 | B | 33 | 2.15 | 170 | 2.5 | 800 | 4.5 | 6.0 | 8 |
| 3 | C | 33 | 2.149 | 240 | 3.0* | 785 | 4.0 | 8.0 | 6 |
| 4 | C | 40 | 2.149 | 500 | 2.2 | 860 | 3.0 | not determined | 8 |
| 5 | C | 47 | 2.149 | 700 | 2.7 | 840 | 3.0 | not determined | 10 |
| 6 | D | 33 | 2.148 | 200 | 2.1* | 800 | 4.0 | 7.8 | 6 |
| 7 | E | 33 | 2.161 | 255 | 2.1* | 860 | 4.0 | 8.3 | 5 |
| 8 | E | 47 | 2.161 | 800 | 2.3 | 780 | 2.9 | 8.0 | 10 |
| 9 | F | 47 | 2.19 | 600 | 2.8 | 750 | 3.0 | 7.5 | 8 |
| 10 | G | 40 | 2.195 | 550 | 2.5 | 800 | 2.8 | 7.5 | 7 |
| 11 | H | 22 | 2.169 | 280 | 2.5* | 800 | 3.8 | 8.0 | 7 |
| 12 | I | 33 | 2.17 | 200 | 2.5* | 810 | 4.2 | 11.0 | 6 |
| 13 | J | 33 | 2.150 | 200 | 2.5 | 800 | 4.0 | 9.0 | 7 |

Footnote to Table II:
*These flow time values were determined using a 25 g sample of product; the remaining values were determined using a 50 g sample of product. If determined using a 25 g sample of product, the latter values would give flow time values lower by a factor of about 0.5.

The granulation, in accordance with the invention, to give sinterable polymer powders containing filler is carried out as follows: 14.4 kg of the polymer dispersion indicated in Table III below, which has a solids content of 20% by weight, relative to the dispersion, are put into a 30 l glass vessel equipped with a stirrer made by Ekato (Type R 46-000; diameter of the stirring element = 15 cm), and are diluted to a solids content of 12% by weight by adding water. The mixure is now stirred at a speed of 500 rpm and a stirring energy of 30 $J.s^{-1}l^{-1}$, and the quantity of filler (% by weight, relative to polymer) indicated in Table III below is added. The speed of the stirrer is then increased to 700 rpm and the stirring energy to 34 $J.s^{-1}l^{-1}$ and 30 $cm^3$ of concentrated hydrochloric acid are added. After a short time distinct optical inhomogeneities in the dispersion (so-called streaks) ae observed, indicating that an adequate degree of thickening has been reached. After a further 2 minutes the quantity (% by weight, relative to polymer) of benzene with a boiling range of 80° to 110° C. indicated in Table III is added and stirring is continued for a further 60 minutes. The granules formed are then separated from the liquid phase via a sieve and are stirred up in 20 l of deionized water and this washing procedure is repeated six times and the granules containing filler are then dried for 6 hours in a circulating air drying cabinet at 280° C. to give a sinterable polymer powder containing filler. The values listed in the following table are determined on this polymer powder:

TABLE IV

Testing a 1 kg block and veneer-cut films

| Granules from Example No. | Formation of cracks starts at mm φ | 200μ veneer-cut film | | | Deformation under load % |
|---|---|---|---|---|---|
| | | T.S. $N/mm^2$ | E.B. % | Electric breakdown strength kV/mm | |
| 2 (B) | crack-free | 28 | 400 | 58 | 13 |
| 3 (C) | crack-free | 32 | 455 | 62 | 7.8 |
| 4 (C) | crack-free | 28.1 | 440 | 40 | — |
| 6 (D) | crack-free | 30.5 | 470 | 61 | 8.0 |
| 7 (E) | crack-free | 31.1 | 535 | 50 | 8.1 |

TABLE V

Ram extrusion of rods and tubes

| Granules from Example No. | Sintering procedure | Particle size d·50 μ | Bulk density g/l | Flow time seconds | Rod of φ 22 mm | | Tube | | |
|---|---|---|---|---|---|---|---|---|---|
| | | | | | T.S. $N/mm^2$ | E.B. (longitudinally) % | T.S. $N/mm^2$ | E.B. (longitudinally) % | T.S. $N/mm^2$ | E.B. (transversely) % |
| 1 (A) | Heating to 340° C.* | 420 | 1275 | 1.5 | 25 | 390 | 22 | 300 | 21 | 310 |
| 2 (B) | Heating to 340° C. | 480 | 995 | 1.5 | 24 | 380 | 21 | 320 | 21 | 300 |
| 4 (C) | Heating to 340° C. | 450 | 1350 | 1.9 | 25 | 390 | 25 | 380 | 19 | 310 |
| 4 (C) | none | 500 | 860 | 2.9 | 27 | 310 | 27 | 400 | 25 | 310 |
| 6 (D) | none | 200 | 800 | 2.1 | 25 | 330 | not tested | | | |
| 8 (E) | none | 800 | 780 | 2.3 | 29 | 390 | 25 | 410 | 23 | 380 |
| 8 (E) | Heating to 340° C.* | 750 | 1300 | 1.5 | | | | | | |

Footnote to Table V
*The granules according to Examples Nos. 1, 2, 4 and 8 are spread out to form a layer 0.5 cm high and are presintered by heating to 340° C. at a rate of 170° C. per hour and cooling to room temperature at a rate of 150° C. per hour.

The sinterable polymer powders which contain filler and have been prepared in accordance with Examples 13 to 16 are tested as described earlier in the text, the values listed in Table VI below being determined.

In Tables IV to VI T.S. denotes tensile strength and E.B. denotes elongation at break. The direction of testing is noted in brackets after the elongation at break. The letters in brackets after the example numbers refer to the polymerization batch used (see Table I).

TABLE III

Granulation of some dispersion polymers listed in Table I in the presence of fillers

| Example No. | Polymerization batch | Benzine for granulation % by weight | Filler | | Powder analysis | | | | |
|---|---|---|---|---|---|---|---|---|---|
| | | | Nature | % by weight | Particle size d 50 μ | Flow time seconds | Bulk density g/l | Particle stability seconds | Specific surface area $m^2/g$ |
| 13 | C | 33 | Glass | 15 | 550 | 2.6 | 713 | 3.1 | 6.7 |
| 14 | B | 33 | Coal | 25 | 570 | 2.9 | 650 | 2.5 | 5.8 |
| 15 | B | 33 | Graphite | 33 | 600 | 2.8 | 640 | 2.7 | — |
| 16 | B | 33 | Bronze | 60 | 600 | 1.2 | 1,350 | 1.2 | 2.1 |

The sinterable polymer powders which do not contain fillers and are obtained in accordance with Examples 1 to 9 are tested, as described earlier in the text, in 1 kg sintered blocks, which are veneer-cut to give films 200 μm thick, and are also tested by ram extrusion of rods and tubes and, in the course thereof, the results listed in Tables IV and V below are determined:

TABLE VI

Results of testing the dispersion polymers which have been granulated in the presence of fillers

| Granules from Example No. | SSG $g/cm^3$ | T.S. $N/mm^2$ | E.B. % | Ball indentation hardness $N/mm^2$ | Deformation under load % |
|---|---|---|---|---|---|
| 13 (C) | 2.20 | 18.9 | 378 | 37 | 6.0 |
| 14 (B) | 2.118 | 16.7 | 105 | 41.1 | 5.6 |
| 15 (B) | 2.078 | 16.9 | 70 | 45.5 | 4.1 |
| 16 (B) | 3.909 | 12.6 | 10 | 39 | 4.9 |

We claim:

1. Sinterable polymer powder consisting of 98.5 to 100% by weight of polymerized tetrafluoroethylene units and 1.5 to 0% by weight of polymerized units of at least one perfluorinated monomer in which one fluorine atom can be replaced by chlorine and which can be copolymerized with tetrafluoroethylene, which polymer powder combines the following properties: specific surface area of 5 to 11 m$^2$/g; standardized specific gravity of less than 2.2; flow time of less than 3.1 seconds/25 g; bulk density of 750 to 860 g/l; particle stability of 2.7 to 5 seconds/50 g; moldability index of less than 11 and deformation under load of less than 14%.

2. Sinterable polymer powder as claimed in claim 1, which has a standardized specific gravity of less than 2.17 g/cm$^3$.

3. Sinterable polymer powder as claimed in claim 1, which has a deformation under load of less than 8%.

4. Sinterable polymer powder as claimed in claim 1, wherein the polymer is prepared in accordance with the seed technique by polymerization in an aqueous medium in the presence of 0.01 to 0.5% by weight, relative to the aqueous medium, of at least one fluorinated dispersing agent which is inactive as a telogen, employing 5 to 10% by weight, relative to the final polymer obtained therefrom, of a seed polymer which consists of 94 to 99.99% by weight of polymerized tetrafluoroethylene units and 6 to 0.01% by weight of polymerized units of a perfluorinated monomer in which one fluorine atom can be replaced by chlorine, the last two % by weight figures relating to the seed polymer.

5. Sinterable polymer powder as claimed in claim 1, the polymer of which consists of 98.5 to 99.99% by weight of polymerized tetrafluoroethylene units and 1.5 to 0.01% by weight of polymerized units of at least one perfluorinated monomer which contains a $CF_2=C<$ group; 3 to 6 carbon atoms and 0 to 2 oxygen atoms.

6. Sinterable polymer powder as claimed in claim 5, wherein the perfluorinated monomer is a straight-chain perfluoroalkyl vinyl ether.

7. Sinterable polymer powder as claimed in claim 5, wherein the perfluorinated monomer is perfluoropropylene.

* * * * *